United States Patent [19]

Norton et al.

[11] 4,261,684

[45] Apr. 14, 1981

[54] MOUNTING OF SIDE SHIFTABLE APPLIANCES ON VEHICLES

[75] Inventors: Harry W. Norton, Ludlow; Leslie A. Brown, Eastham, Nr. Tenbury Wells, both of England

[73] Assignee: F. W. McConnel Limited, England

[21] Appl. No.: 15,811

[22] Filed: Feb. 27, 1979

[30] Foreign Application Priority Data

Mar. 1, 1978 [GB] United Kingdom ............... 8018/78

[51] Int. Cl.³ ............................................. E02F 3/32
[52] U.S. Cl. ................................. 414/695; 37/117.5;
74/103; 280/478 R; 414/705
[58] Field of Search ............... 414/695, 695.5, 695.6,
414/705, 718; 280/477, 478 R, 478 A, 478 B;
74/103; 37/117.5

[56] References Cited

U.S. PATENT DOCUMENTS

| 2,198,635 | 4/1940 | Rossman | 74/103 |
|---|---|---|---|
| 3,099,358 | 7/1963 | Clark | 414/695 X |
| 3,250,410 | 5/1966 | Dorkins | 414/695 |
| 3,728,768 | 4/1973 | Mori | 414/695 X |

FOREIGN PATENT DOCUMENTS 684904 4/1966 Belgium ............................. 414/695.5

Primary Examiner—Stephen G. Kunin
Assistant Examiner—Terrance L. Siemens
Attorney, Agent, or Firm—Staas and Halsey

[57] ABSTRACT

A device for mounting an appliance (such as a backhoe excavator) on a vehicle (such as a tractor) comprises a fixed frame secured to the vehicle, and a movable frame to which the appliance is pivotally connected by means of a kingpost. The movable frame has elements thereon which are slidable along respective linear guides on the fixed frame, thereby enabling the movable frame to be pivoted relative to the fixed frame under the control of a drive so as to offset the kingpost from the center line of the vehicle. The guides converge at a predetermined angle rearwardly of the vehicle, and the elements subtend the same angle to the kingpost so that the kingpost moves along a straight line at right angles to the vehicle center line as the movable frame is pivoted with respect to the fixed frame. This arrangement enables the appliance to be pivoted relative to the vehicle about a comparatively large angle without fouling the rear (particularly the rear wheels) of the vehicle.

8 Claims, 8 Drawing Figures

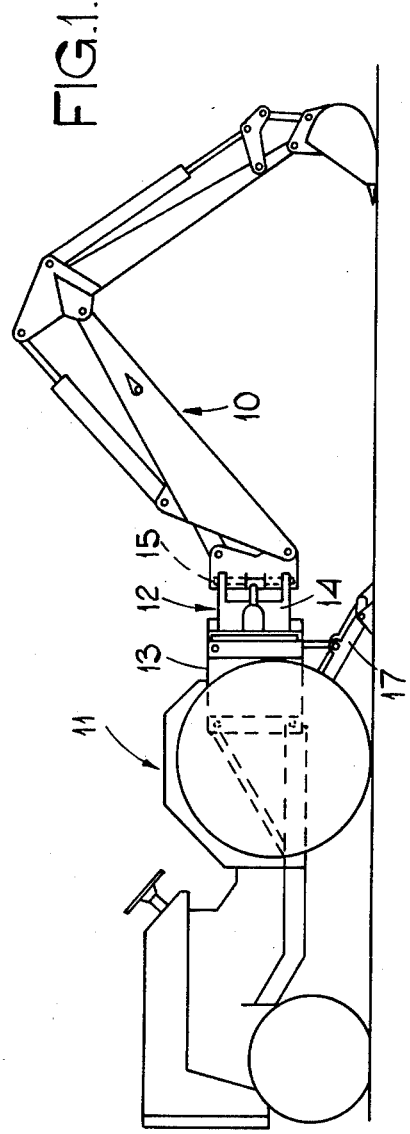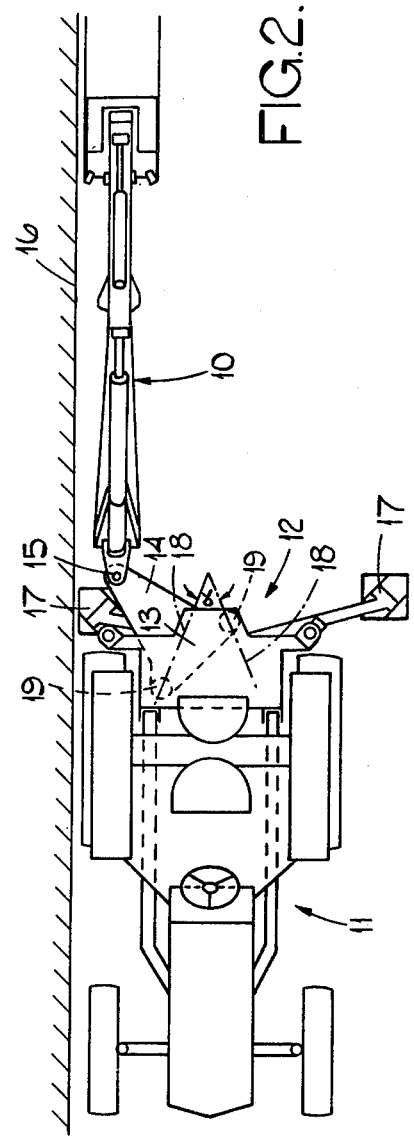

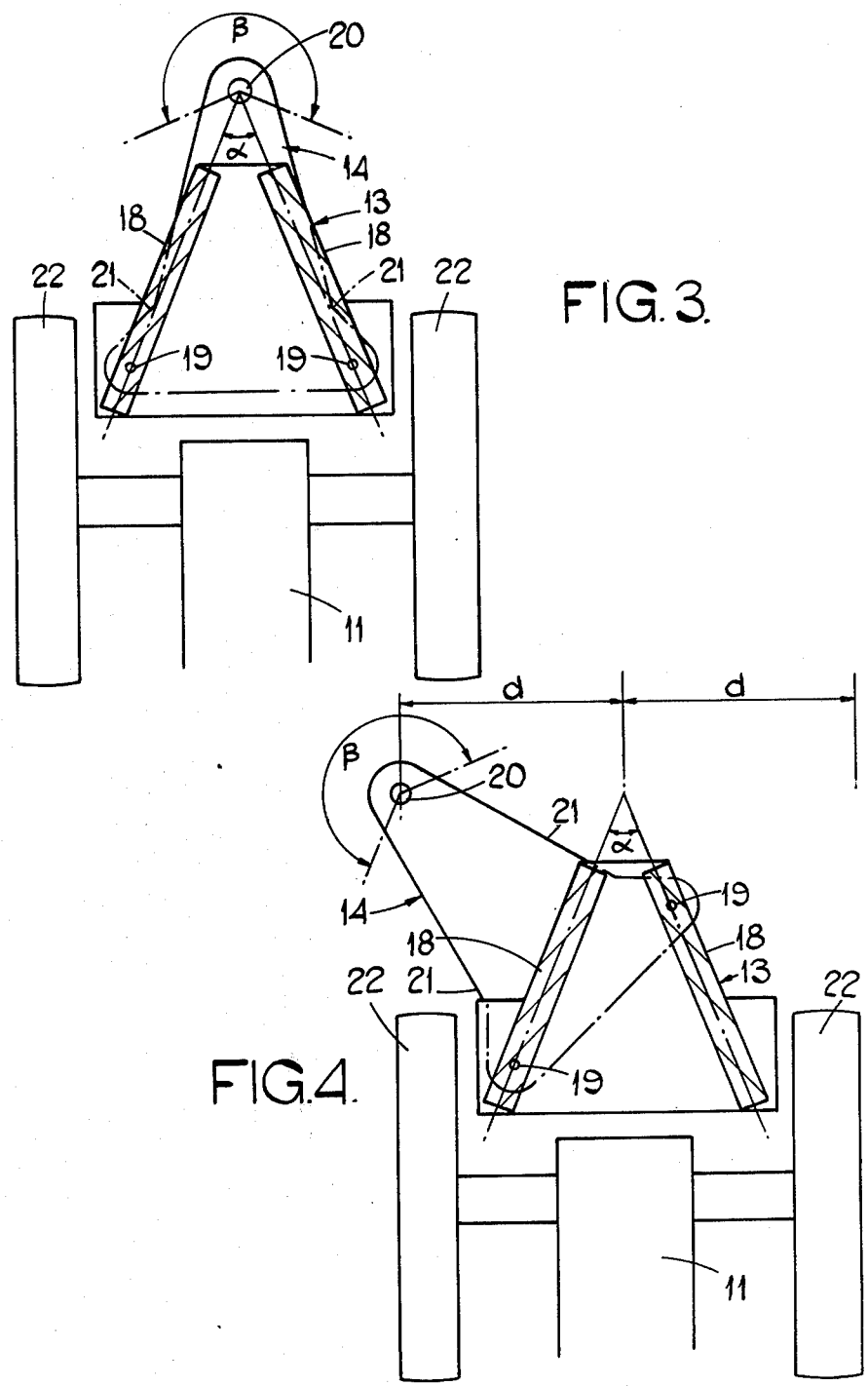

MOUNTING OF SIDE SHIFTABLE APPLIANCES ON VEHICLES

This invention relates to a device for mounting an appliance on a vehicle, and principally to an offset mounting for a backhoe excavator.

Where an appliance is mounted on the rear of a vehicle (e.g. a tractor) for swinging movement in a horizontal plane about a kingpost, it is often desirable to allow the kingpost to be offset from the centre line of the vehicle to enable the appliance to perform operations close to a wall or other obstruction. Previously, this has been done by providing a transverse frame across the rear of the vehicle with vertically movable stabilizer legs mounted at either end thereof, and to arrange the kingpost bearing and swinging mechanism so that they can be moved along this frame transversely of the vehicle and securely clamped in the required position. With this arrangement, however, it is difficult to swing the appliance through an angle much in excess of 180° because the appliance tends to foul the transverse frame. In addition, unless the kingpost is cantilevered a considerable distance rearwardly of the frame, the choice of swinging mechanism is restricted to rotary actuators or rack and pinion devices, which are expensive and difficult to achieve with positive sealing and without excessive backlash.

For this reason, smaller lighter duty and lower powered vehicles (which must be built to a viable market price) commonly use opposed hydraulic rams to swing the appliance through some form of linkage which gives a reasonably constant force and velocity throughout the arc of travel. However, such rams are often difficult to accommodate without excessive rearward overhang unless the space between the rear wheels or tracks of the vehicle is utilized, in which case the extent by which the kingpost can be offset is restricted by those wheels or tracks.

It has been proposed to overcome this problem by mounting the kingpost on a swingable arm assembly which is itself pivoted about a vertical axis between the rear wheels or tracks of the vehicle, and to support the hydraulic rams on this arm assembly. Although this arrangement allows the kingpost to be offset by a comparatively large amount without interference between the rams and the rear wheels or tracks, and also increases the angle through which the appliance can be swung by the amount of movement of the arm assembly about its own pivot, it has the disadvantage of significantly increasing the rearward overhang of the kingpost at its central (i.e. non-offset) position.

It is an object of the present invention to obviate or mitigate the above-described problems and disadvantages.

According to the present invention, there is provided a device for mounting an appliance on a vehicle, comprising a first frame including a pair of generally linear guide means which converge at a predetermined angle, a second frame including elements locatable in the guide means respectively so as to permit movement of the elements along the guide means with simultaneous pivotal movement between the first and second frames, one of the frames being for attachment to said vehicle in use, the other of the frames being for mounting said appliance in use, and a drive operable to effect relative angular movement between the frames in use.

Preferably, said other of the frames has means thereon for the pivotal mounting of said appliance for movement about a pivot axis, the locus of said pivot axis as relative angular movement between the frames is effected in use being a generally straight line. This can be achieved by arranging for the pivot axis to lie generally at the point of convergence of the guide means when it is disposed on the bisector of said predetermined angle. Where the other of the frames is the second frame, this can be achieved by arranging for the elements to subtend an angle to the pivot axis which is generally equal to said predetermined angle.

The drive can comprise means operable to pivot the appliance relative to said other of the frames, relative angular movement being effected between the frames in use by grounding the appliance and operating said means.

Each guide means can comprise a pair of mutually parallel and spaced linear guides, in which case the second frame is provided with four elements arranged in aligned pairs, the elements in each pair being locatable respectively in the guides of each guide means.

Clamping means can be provided for clamping the elements and the guide means against relative movement therebetween. Preferably, the clamping means includes, for each element, a draw bolt having at least one chamfered surface, movement of the draw bolt relative to the respective element being arranged to exert a transverse clamping force between the element and the respective guide means. In one example, chamfered clamping blocks are interposed between each draw bolt and the respective guide means, and axial movement of the draw bolt is arranged to urge the clamping blocks transversely into engagement with the guide means. In an alternative example, the guide means are themselves provided with chamfered surfaces with which the chamfered draw bolts engage.

Embodiments of the present invention will now be described by way of example, with reference to the accompanying drawings, in which:

FIG. 1 is a side view of a backhoe excavator mounted on the rear of a tractor by means of a mounting device according to the present invention;

FIG. 2 is a plan view of the arrangement illustrated in FIG. 1, showing the excavator in an offset position;

FIG. 3 is a schematic view of the mounting device in a central position;

FIG. 4 is a schematic plan view of the mounting device in an offset position;

Figure 5:
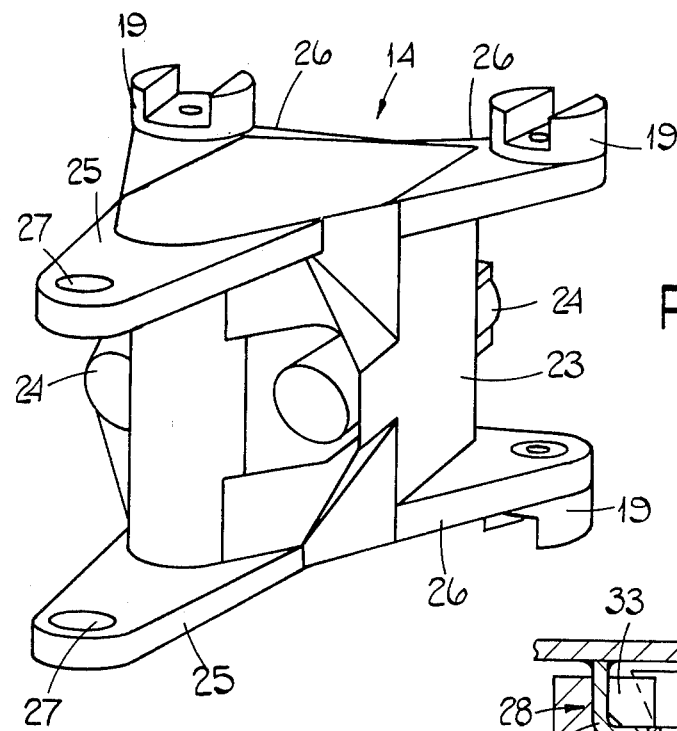
FIG. 5 is a perspective view of a movable frame which forms part of the mounting device.

Referring first to FIGS. 1 and 2, there is shown therein an appliance 10 (in this case, a backhoe excavator) mounted on the rear of a tractor 11 by means of a mounting device 12. The mounting device comprises a fixed frame 13 which is secured to the tractor 11 and a movable frame 14 to which the excavator 10 is pivotally connected by means of a kingpost 15. The frame 14 can be moved angularly relative to the frame 13 so as to offset the kingpost 15 from the centre line of the tractor 11, thereby enabling the excavator 10 to, for example, dig a trench close to a wall 16 or other obstruction, as shown in FIG. 2. A pair of stabilizing feet 17 are mounted on the frame 13 and can be lowered into contact with the ground, as shown, to stabilize the tractor during operation of the excavator.

Referring now also to FIGS. 3 and 4, the fixed frame 13 includes a pair of guide means 18 (shown schematically) which converge rearwardly of the vehicle at a predetermined angle α. The movable frame 14 is generally triangular in plan and includes elements 19 adjacent two of its apices and a bearing 20 for the kingpost adjacent its third apex. Sides of the frame 14 are recessed at 21 so that the frame 14 is not obstructed by rear wheels 22 of the tractor 11 as it is moved angularly relative to the frame 13.

The elements 19 (which are illustrated schematically in FIGS. 3 and 4) are received by the guide means 18 in a manner which permits movement of the elements 19 along the guide means 18 with simultaneous pivotal movement therebetween. The angle subtended by the elements 19 to the bearing 20 is made equal to the angle α so that the locus of the bearing 20 as the frame 14 is moved angularly relative to the frame 13 is a straight line perpendicular to the centre line of the tractor 11. It will be manifest that, as shown in FIG. 3, the bearing 20 lies at the point of convergence of the guide means 18 when it is disposed in a non-offset position.

By virtue of the above arrangement, the bearing 20 can be offset by a comparatively large distance d on either side of the centre line of the tractor without the frame 14 fouling the rear wheels 22 (see FIG. 4), and the excavator can pivot about the bearing 20 through an angle β which is rather more than 180°.

The movable frame 14 is shown in detail in FIG. 5, and comprises a rigid central box structure 23 pierced at two points to accept a pair of driving rams 24 by means of which angular movement of the excavator 10 relative to the frame 14 in one direction or the other can be effected. At upper and lower ends of the structure 23 are provided rearwardly extending lugs 25 and sideways extending lugs 26, which define the generally triangular plan of the frame 14. The bearing for the kingpost is formed by vertically aligned bearing devices 27 (illustrated schematically) on the lugs 25 respectively. The elements 19 are mounted on the lugs 26, four elements being provided in total and being arranged in vertically aligned pairs. Each element 19 is in the form of a cast or forged birfurcated jaw which is pivoted on the frame 14, the jaws in each vertically aligned pair being pivotable about a common vertical axis.

Figure 6:
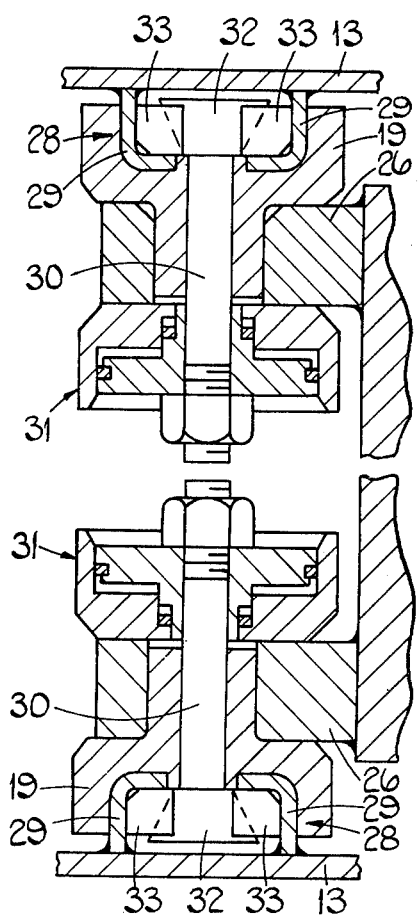
FIG. 6 is a sectional view of one form of clamping means which also forms part of the mounting device.
Figure 7:
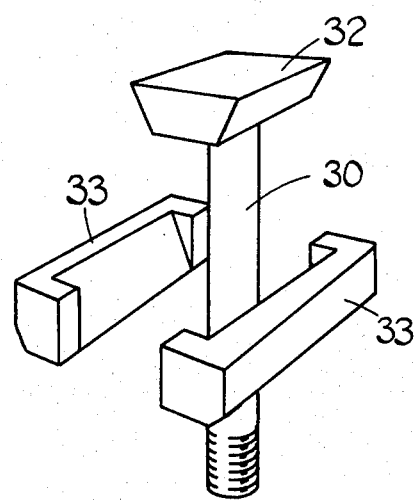
FIG. 7 is a perspective view of part of the clamping means shown in FIG. 6.

Referring now to FIG. 6, each guide means comprises a pair of vertically spaced, parallel guides 28 with which the elements 19 in each vertically aligned pair are respectively engaged (only one of the guide means being shown for convenience). Each guide 28 is composed of two parallel, opposed angled rails 29 which are embraced by the forks of the respective element 19. Clamping means is provided for clamping each element 19 to its respective guide 28 while the frame 14 is in a desired offset position and the excavator is in operation. As shown in detail in FIG. 7, the clamping means comprising a draw bolt 30 which is movable axially under actuation of an hydraulically operable piston and cylinder arrangment 31 (FIG. 6), the draw bolt 30 having a chamfered head 32 which is positioned between the rails 29 of the respective guide 28. Chamfered clamping blocks 33 are interposed between the chamfered head 32 of the draw bolt 30 and the guide rails 29 respectively, and each element 19 is clamped to the respective guide 28 by pressurising the respective piston and cylinder arrangement 31 so as to move the draw bolt 30 axially and cause the head 32 thereof to urge the clamping blocks 33 outwardly and into engagement with the guide rails 29.

In order to change the amount by which the kingpost 15 is offset from the tractor centre line, the bucket or other attachment on the free end of the excavator 10 is placed on the ground with sufficient force to take the weight of the excavator and the movable frame 14, and the piston and cylinder arrangements 31 are depressurised to unclamp the elements 19 from the guides 28. The driving rams 24 are then operated and have the effect of moving the frame 14 angularly relative to the frame 13. When the kingpost 15 reaches the desired position, the piston and cylinder arrangements 31 are repressurized to clamp the frame 14 securely to the frame 13.

To assemble the frame 14 on the frame 13, one of the vertically aligned pairs of elements 19 (complete with their clamping means) are aligned with the guides 28 respectively of the appropriate one of the guide means 18 and are engaged with the guides with the frame 14 in its fully offset position. These elements 19 are then moved sufficiently far along the guides 28 until the other vertically aligned pair of guides 19 can be engaged with the guides 28 respectively of the other guide means. The frame 14 can be dismantled from the frame 13 by reversing the above procedure. To prevent inadvertent disengagement of the frame 14 from the frame 13 in use, blocks (not shown) are securely bolted to the guides 28 to block off the rear ends of the latter.

Figure 8:
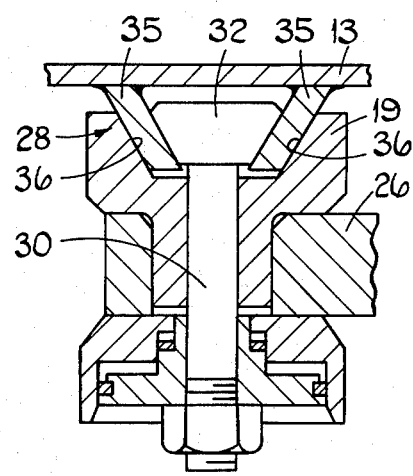
FIG. 8 is a sectional view of an alternative form of clamping means to that shown in FIG. 6.

FIG. 8 illustrates a modification of the above-described mounting device, in which each guide 28 comprises a pair of parallel rails 35 which are mutually inclined in a plane perpendicular to their direction of extent. Inwardly facing surfaces 36 of the forks of each element 19 are chamfered so as to be complementary to the outer surfaces of the rails 35, and the clamping blocks of the clamping means are dispensed with so that the chamfered head 32 of the draw bolt 30 acts directly on the rails 35 in use.

I claim:

1. A device for mounting an appliance on a vehicle, comprising a first frame including a pair of generally linear guide means which converge at a predetermined angle, a second frame including elements located in said guide means respectively and permitting movement of said elements along said guide means with simultaneous pivotal movement between said first and second frames, one of said first and second frames being adapted for connection to said vehicle, the other of said first and second frames being adapted to mount said appliance, a drive operable to effect relative angular movement between said first and second frames, said other of said first and second frames has means thereon adapted to mount said appliance for pivotal movement about a pivot axis, the locus of said pivot axis as relative angular movement between the said first and second frames is effected being a generally straight line, and wherein said pivot axis lies generally at a point of convergence of said guide means when it is disposed on the bisector of said predetermined angle.

2. A device for mounting an appliance on a vehicle, comprising a first frame including a pair of generally linear guide means which converge at a predetermined angle, a second frame including elements located in said guide means respectively and permitting movement of said elements along said guide means with simultaneous pivotal movement between said first and second frames, one of said first and second frames being adapted for connection to said vehicle, the other of said first and second frames being adapted to mount said appliance, a drive operable to effect relative angular movement between said first and second frames, said other of said first and second frames has means thereon adapted to mount said appliance for pivotal movement about a pivot axis, the locus of said pivot axis as relative angular movement between the said first and second frames is effected being a generally straight line, and wherein said other of the first and second frames is said second frame, and said elements subtend an angle to said pivot axis which is generally equal to said predetermined angle.

3. The device according to claim 1 or 2, wherein said drive comprises means operable to pivot said appliance relative to said other of the first and second frames.

4. A device for mounting an appliance on a vehicle, comprising a first frame including a pair of generally linear guide means which converge at a predetermined angle, a second frame including elements located in said guide means respectively and permitting movement of said elements along said guide means with simultaneous pivotal movement between said first and second frames, one of said first and second frames being adapted for connection to said vehicle, the other of said first and second frames being adapted to mount said appliance, a drive operable to effect relative angular movement between said first and second frames, and wherein each said guide means comprises a pair of mutally parallel and spaced linear guides, and said second frame is provided with four of said elements which are arranged in aligned pairs, said elements in said each aligned pair being located respectively in said guides of each said guide means.

5. The device according to claim 1, 2 or 4 further comprising clamping means for clamping said elements and said guide means against relative movement therebetween.

6. The device according to claim 5, wherein said clamping means includes, for each said element, a draw bolt having at least one chamfered surface, movement of said draw bolt relative to said element exerting a transverse clamping force between said element and the respective one of said guide means.

7. The device according to claim 6, wherein chamfered clamping blocks are interposed between said each said draw bolt and the respective one of said guide means, and axial movement of said draw bolt urges said clamping blocks transversely into engagement with said guide means.

8. The device according to claim 6, wherein said guide means are provided with chamfered surfaces with which said chamfered draw bolts engage.

* * * * *